3,350,313
SULFONIUM METHYLIDE COMPOUNDS AND POLYMERIC COMPOSITIONS CONTAINING THEM
Peter J. Graham, Gladwyne, Pa., and William J. Linn and William J. Middleton, Wilmington, Del., assignors to E. I. du Pont de Nemours and Company, Wilmington, Del., a corporation of Delaware
No Drawing. Original application Apr. 11, 1963, Ser. No. 272,200, now Patent No. 3,282,961, dated Nov. 1, 1966. Divided and this application Nov. 12, 1965, Ser. No. 516,188
5 Claims. (Cl. 252—63.7)

ABSTRACT OF THE DISCLOSURE

New blends of polymers, preferably thermoplastic, and sulfonium methylide compounds with the structural formula,

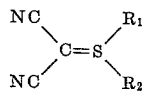

wherein $R_1$ and $R_2$ are alkyl or aryl groups. These blends are useful as electrical insulators because of their high dielectric constants and/or low loss factor.

---

This application is a divisional application of our copending application Ser. No. 272,200 filed Apr. 11, 1963, now U.S. Patent No. 3,282,961.

This invention relates to new and useful sulfonium methylide compounds and to polymeric compositions containing these compounds.

The rapid expansion of the electrical and electronics industries in recent years has created a demand for new types of electrical insulation materials. These materials are needed in many different forms to meet the requirements of various assembly methods and use conditions. For example, polymeric material having a high dielectric constant, a low dissipation factor, good polarizability and a suitable second order transition temperature is needed as a phosphor binder and electrode adhesive in the manufacture of electroluminescent lighting panels. Also, the makers of capacitors and condensers need liquid and finely divided solid dielectric materials for the manufacture of coated or impregnated papers and fabrics having high dielectric constant.

Stated broadly, the novel compounds of this invention are sulfonium methylide compounds of the following formula.

Formula A

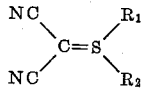

In Formula A, $R_1$ and $R_2$ can either be separate groups or they can constitute a single $C_3$ to $C_6$ group which together with the sulfur atom to which the single group is attached forms a non-aromatic cyclic group. When $R_1$ and $R_2$ are separate groups, $R_1$ can be a $C_1$ to $C_{20}$ alkyl or substituted alkyl (when the alkyl is higher than $C_1$) and $R_2$ can be a $C_1$ to $C_{20}$ alkyl or substituted alkyl, or an aryl or substituted aryl. The substituent on the $C_2$ to $C_{20}$ alkyl can be, for example, F, CN, Br, Cl, $OCH_3$ or $CO_2R$ (R being lower alkyl).

The novel polymeric composition of this invention, which is described in detail hereinbelow, is comprised of an intimate blend of a polymer and a compound of Formula A.

A general description of four different methods of preparing the novel sulfonium methylide compounds follows.

*Method M–1: Reaction of TCNEO and a sulfide.*—Compounds of Formula A can be prepared by reacting tetracyanoethylene oxide (TCNEO), which has the formula

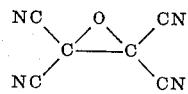

with a sulfide compound of the formula $R_1$—S—$R_2$ wherein $R_1$ and $R_2$ are as defined above in Formula A. The TCNEO and the sulfide are mixed together and allowed to react until the sulfonium methylide compound is formed. The reaction can be carried out over a wide range of temperatures and pressures, but a temperature of about 10 to 50° C. and a pressure at or near atmospheric pressure is usually preferred.

*Method M–2: Reaction of an oxirane and a sulfide.*—The Formula A compounds can be prepared by reacting a sulfide compound as described in Method M–1 with a 2,2-dicyano-3,3-bis(polyfluoroalkyl) oxirane according to the equation:

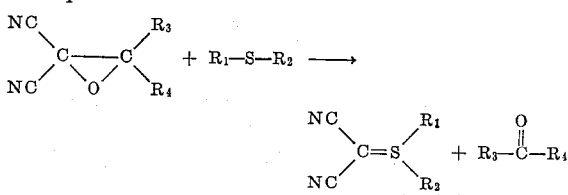

$R_3$ and $R_4$ in the above equation (1) can be separate groups selected individually from the class consisting of perfluoroalkyl, omega-chloroperfluoroalkyl and omega-hydroperfluoroalkyl groups of 1 to 18 carbon atoms, or (2) they can constitute a single perfluoroalkylene group of 1 to 8 carbon atoms, preferably hexafluorotrimethylene, octafluorotetramethylene, or decafluoropentamethylene.

The oxirane compound shown in the above equation can be prepared by reacting malononitrile with a polyfluoroalkyl ketone (Formula B in Table I below) in the presence of zinc chloride at about 50 to 150° C. The resulting hydroxy compound (Formula C in Table I) is usually a crystalline solid which can be isolated and purified in a conventional manner, or it can be used in impure form in the next step. Next, the Formula C compound is dehydrated to form the corresponding 1,1-dicyano-2,2-bis(polyfluoroalkyl) ethylene (Formula D in Table I).

Table I

Formula B

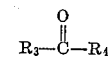

Formula C

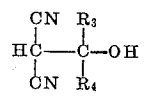

Formula D

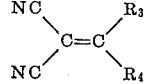

In Formulas B, C and D, $R_3$ and $R_4$ are the same as described above.

The Formula C compound can be dehydrated by heating it in the presence of a water acceptor, for example, phosphorous pentoxide, at a temperature which permits the Formula E compound to be separated as it is formed by distillation from the reaction vessel.

Finally, the Formula D compound can be converted to the oxirane compound by reacting it with hydrogen peroxide or a suitable organic peracid (preferably the latter) for example, peracetic acid. This reaction is carried out at atmospheric pressure at a temperature of about −20 to 50° C. The oxirane compound can be isolated from the reaction mixture by distillation.

The oxirane compounds useful in practicing Method M-2 include the following:

2,2-dicyano-3,3-bis(trifluoromethyl)oxirane
2,2-dicyano-4,4,5,5,6,6-hexafluoro-1-oxaspiro[2.3]hexane
2,2-dicyano-4,4,5,5,6,6,7,7-octafluoro-1-oxaspiro [2.4] heptane
2,2-dicyano-4,4,5,5,6,6,7,7,8,8-decafluoro-1-oxaspiro [2.5]octane
2,2-dicyano-3,3-bis(pentafluoroethyl)oxirane
2,2-dicyano-3-heptafluoropropyl-3-trifluoromethyl-oxirane
2,2-dicyano-3-perfluoroethyl-3-perfluoroheptyloxirane
2,2-dicyano-3,3-bis(perfluoroheptyl)oxirane
2,2-dicyano-3-perfluoroheptadecyl-3-perfluoromethyl-oxirane
2,2-dicyano-3,3-bis(perfluoroheptadecyl)oxirane
2,2-dicyano-3,3-bis(chlorodifluoromethyl)oxirane
2,2-dicyano-3,3-bis(4-chloroperfluorobutyl)oxirane
2,2-dicyano-3,3-bis(6-chloroperfluorohexyl)oxirane
2,2-dicyano-3-difluoromethyl-3-trifluoromethyloxirane
2,2-dicyano-3,3-bis(difluoromethyl)oxirane
2,2-dicyano-3-(4H-perfluorobutyl)-3-(12H-perfluorodo-decyl)oxirane
2,2-dicyano-3,3-bis(12H-perfluorododecyl)oxirane The oxirane compound and the sulfide are mixed together and allowed to react until the sulfonium methylide compound is formed. Temperature and pressure are not critical, but a temperature of about 10 to 50° C. and a pressure at or near atmospheric pressure is usually preferred.

The use of a liquid reaction medium is preferred since it facilitates control of the reaction temperature. The liquid medium can consist of a molar excess of a liquid reactant or it can be a liquid that is a solvent for the reactant mixture but does not react chemically therewith, for example, diethyl ether, tetrahydrofuran, pentane or acetonitrile.

The best yields and the easiest isolation of the product usually result from the use of a sulfide:oxirane molar ratio of about 1:2 to 2:1, but there is nothing critical about this range. For example, useful results can also be obtained with ratios of 1:20 to 20:1.

*Method M-3: Reaction of malononitrile and dimethyl sulfoxide.*—The Formula A compound wherein $R_1$ and $R_2$ are methyl, that is, dimethylsulfonium dicyanomethylide can be prepared by first reacting malononitrile

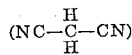

with dimethyl sulfoxide ($H_3C$—SO—$CH_3$) in the presence of an acid catalyst, for example, anhydrous HCl or thionyl chloride. The resulting intermediate product, for example, the dihydrochloride of the dimethyl compound, is then converted to dimethylsulfonium dicyanomethylide by reacting it with a base such as aqueous sodium bicarbonate.

*Method M-4: Reaction of bromomalononitrile with dimethyl sulfide.*—The dimethyl compound (dimethylsulfonium dicyanomethylide) can also be prepared by stirring a blend of dimethyl sulfide and bromomalononitrile (e.g., a chloroform solution thereof) until the intermediate dihydrobromide of the dimethyl compound is formed, and reacting the intermediate with a base such as aqueous sodium bicarbonate.

Polymeric compositions are obtainable in accordance with this invention which have advantageous electrical properties such as high dielectric constant, and/or low loss factor. These compositions are comprised of a solid solution or a stable dispersion of a Formula A compound in a polymer. The weight ratio of the Formula A compound to the polymer can be from about 0.5:99.5 to about 99.5:0.5, preferably about 1:99 to 80:20.

The "polymer" can consist of pure polymer or a mixture of polymer and one or more known additives, for example, a filler, pigment, plasticizer or antioxidant. When the polymer is a solid at the temperature at which the product is to be used, it is preferred that the polymer be capable of forming a solid solution with the compound in the proportions used.

A wide range of polymers can be used in preparing these new and useful compositions, including, for example: cellulose esters and ethers, polymers of alkyl acrylates, alkyl methacrylates and blends thereof, polyvinyl chloride and other vinyl halide polymers, polystyrene, polyamides, polyimides, polyethylene terephthalate, polyethylene, polyisobutylene (including the tacky fluid form), polytetrafluoroethylene, polyurethanes, polyacrylonitrile, and copolymers of acrylonitrile with various monomers such as alkyl acrylates and acrylic or methacrylic acid.

A preferred polymeric composition of this invention is useful as a phosphor binder in electroluminescent lighting panels from which instrument lights, night lights and the like are manufactured. This composition is prepared by dissolving a Formula A compound in a solid thermoplastic polymer. The best electrical properties are often obtained when a polymer is used which gives the composition a second order transition temperature somewhat below the temperature at which the lighting panel will be used, for example, about 10 to 50 degrees below the use temperature.

The second order transition temperature, sometimes referred to in the art as glass transition temperature ($T_g$), is the temperature at which a discontinuity occurs in a curve made by plotting a first derivative thermo-dynamic quantity against temperature (see Pace U.S. Patent 2,578,899). $T_g$ is correlated with the yield temperature and fluidity of the polymer composition; the value can be observed from a plot of density, specific volume, specific heat, sonic modulus or index of refraction against temperature.

The lighting panel containing the novel composition will be used in many applications at a temperature of about −40 to +40° C., although it might also be used, for example, in a deep-freeze unit at a much lower temperature or in an oven at a much higher temperature.

The novel compounds of Formula A, whether in liquid or solid form at ordinary atmospheric temperatures, are useful as electrical insulation materials. The compounds are highly polarizable.

Although the compounds by themselves are useful as electrical insulation, it is expected that they will be employed in most applications as components of plastic compositions, impregnated papers, coated fabrics and the like where the compounds enhance the electric properties of the composite insulation.

The examples which follow are given for the purpose of illustrating the invention. All quantities shown are on a weight basis unless otherwise indicated.

*Example 1.—Dibutylsulfonium dicyanomethylide (Compound #1)*

Compound #1 is prepared by Method M-1 as follows:
A solution of 12.3 grams (0.084 mole) of di-n-butyl sulfide and 7.2 grams of (0.050 mole) of TCNEO in 80 ml. of tetrahydrofuran is prepared and allowed to stand for 138 hours at about 22° C. The tetrahydrofuran is removed by evaporation, leaving a red liquid containing Compound #1 in impure form. The red liquid is dispersed in 30 ml. of ethylene chloride and the resulting dispersion is allowed to wash over 150 grams of alumina in a conventional chromatographic column. The impregnated alumina is then washed with 1 liter of ligroin, which results in the removal of 4.11 grams of unreacted dibutyl sulfide. Next, the alumina is washed with 1.5 liters of ethylene chloride; evaporation of the solvent leaves 6.50 grams (62% yield) of slightly impure Compound #1 in the form of a brownish-yellow viscous liquid which crystallizes at 0° C.

The separated impure Compound #1 is purified by further chromatographic processing and recrystallization in the following manner: The compound is dissolved in 30 ml. of ethylene chloride, the resulting solution is allowed to wash over 100 grams of alumina, the impregnated alumina is washed with 1 liter of ether, the ether is evaporated leaving 5.5 grams of pale yellow liquid (almost pure Compound #1), and the compound is recrystallized twice from ether at 0° C. to yield 3.81 grams of colorless crystals which have a melting point of 29–30° C.

The results of analysis of the product for C, H and N on the basis of $C_{11}H_{18}N_2S$ are as follows:
Calculated: Percent C, 62.90; H, 8.58; N, 13.33. Found: Percent C, 62.98; H, 8.76; N, 13.31.

Compound #1 has a dielectric constant at 25° C. of 52.5, tested at a frequency of 1000 cycles per second.

*Example 2*

A polymeric composition which is surprisingly well adapted for use as a phosphor binder and an electrode adhesive in electroluminescent lighting panels is prepared as follows: The product of Example 1 (debutylsulfonium dicyanomethylide, or Compound #1) is mixed with a 40% xylene solution of a relatively soft, solid acrylic polymer in an amount sufficient to give a 27:73 blend (dry basis) of the compound and the polymer. The solvent is then evaporated from the composition. The polymer is a 50:50 copolymer of ethyl acrylate and methyl methacrylate having a molecular weight of about 5000, a $T_g$ of about −10° C., and a dielectric constant of 5.6. At room temperature the resulting composition is a solid solution of Compound #1 in the polymer; it has a dielectric constant of 36.8, a dissipation factor of 9% and a $T_g$ of −10° C. The dielectric constant is measured at 25° C. at a frequency of 1000 cycles per second.

*Example 3.—Tetramethylenesulfonium dicyanomethylide (Compound #2)*

Compound #2, which has the formula

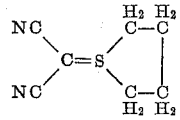

is prepared by Method M–2 as follows:

A solution of 88 parts of tetrahydrothiophene in 714 parts of ether is added gradually with stirring to a precooled solution (0° C.) of 230 parts of 2,2-dicyano-3,3-bis(trifluoromethyl) oxirane in 1170 parts of ether. Stirring is continued for 30 minutes. The reaction that occurs between the thiophene and the oxirane compounds yields Compound #2 as a light yellow precipitate, which is filtered, washed with ether, dried and recrystallized from ethanol. There are obtained 121 parts of crystals in the form of large colorless prisms having a melting point of 94.5 to 95° C. The results of analysis of the product for $C_7H_8N_2S$ are as follows:
Calculated: Percent C, 55.23; H, 5.30; N, 18.41; S, 21.06. Found: Percent C, 55.60; H, 5.67; N, 1813; S, 21.27.

*Example 4.—Dimethylsulfonium dicyanomethylide (Compound #3)*

Compound #3 is prepared by Method M–3 as follows: A glass reaction vessel in the form of a 250 ml. 3-neck flask equipped with a gas addition tube, reflux condenser, thermometer and stirrer is charged with 51.6 grams (0.78 mole) of malononitrile, 60.0 grams (0.77 mole) of dimethyl sulfoxide and 100 ml. of methylene chloride. The resulting methylene chloride solution of the reactants is cooled to 15° C. with the aid of an ice bath. While the solution is stirred and kept at about 15 to 20° C., anhydrous hydrogen chloride is slowly bubbled through the solution for 90 minutes. The resulting exothermic condensation reaction yields a yellow precipitate, which is the dihydrochloride of Compound #3. After allowing the precipitate to settle for 1 hour, it is suction filtered, washed with methylene chloride and dried. The dried precipitate, which weighs 53.5 grams (55% yield) is converted to Compound #3 by dissolving it in 100 ml. of water at 90° C. and adding 5% aqueous sodium bicarbonate stepwise in small portions until the mixture has a pH of about 7.5. The aqueous phase is subjected to extraction by agitating it with 9 successive 50 ml. portions of methylene chloride to extract Compound #3 and the extracted portions are combined, freed of water over magnesium sulfate, filtered, and the methylene chloride is evaporated under vacuum. The amount of crude yellow crystalline Compound #3 obtained is 21 grams (60% yield). The crude material is recrystallized from isopropanol solution as substantially pure Compound #3 in the form of white prism-like crystals. The pure compound melts without decompositions at 99 to 100° C.; it is readily soluble in water, acetone, dichloromethane, chloroform and hot ethyl acetate (70° C.), but is relatively insoluble in diethyl ether and aliphatic hydrocarbons. A 5% aqueous solution of the compound has a pH of 4. The compound has a dielectric constant of about 3 to 6 at room temperature and about 74 at 120° C.

Analysis of the product for $C_5H_6N_2S$ gives the following results:
Calculated: Percent C, 47.59; H, 4.79; N, 22.21; S, 25.41; mol. wt., 126.18. Found: Percent C, 47.74; H, 4.83; N, 22.35; S, 25.27; mol. wt., 125.

*Example 5*

Compound #3 is prepared by a modification of the method used in Example 4, the condensation reaction being catalyzed with thionyl chloride instead of hydrogen chloride.

A 250 ml. reaction vessel equipped with a dropping funnel, reflux condenser, thermometer and stirrer is charged with 44 grams (0.66 mole) of malononitrile, 52 grams (0.66 mole) of dimethyl sulfoxide and 85 ml. of methylene chloride. After cooling the solution to 15° C., it is stirred and kept at 15 to 20° C. while 80 grams (0.66 mole) of thionyl chloride are added drop-wise over a period of 45 minutes. The exothermic condensation reaction that occurs during this period yields the dihydrochloride of Compound #3, a yellow precipitate. The contents of the vessel are allowed to set long enough to return to room temperature, then the precipitate is filtered, washed with methylene chloride and dried. The dried precipitate, which weighs 56.5 grams (68% yield) is converted to Compound #3 in the manner described in Example 4.

*Example 6*

Compound #3 is prepared in accordance with Method M–4 as follows: A solution of 3 grams (0.048 mole) of dimethyl sulfide in 15 ml. of chloroform is added rapidly with stirring to a solution of 7 grams (0.048 mole) of bromomalonitrile in 15 ml. of chloroform. The resulting clear solution is stirred with a magnetic stirrer for 16 hours. The reaction that occurs during this period yields the dihydrobromide of Compound #3, a yellow precipitate. The precipitate is filtered, washed with chloroform and dried. The dried precipitate, which weighs 3.4 grams (34% yield) is converted to Compound #3 in the manner described in Example 4.

Example 7

Compound #3 is prepared in accordance with Method M-1 as follows: A solution of 186 grams of dimethyl sulfide in 1770 grams of diethyl ether is cooled to 0° C.; then 144 grams of tetracyanoethylene oxide are added to the solution with stirring and stirring is continued for 1 hour. The reaction that occurs during this period yields Compound #3 as a precipitate, which is filtered, washed with ether, dried, and recrystallized from isopropanol solution as white crystals of substantially pure Compound #3.

Example 8

A phosphor binder for use in electroluminescent lighting panels is prepared as described in Example 2 except Compound #3 is used in place of Compound #1 and the compound is added to the polymer solution in an amount sufficient to give a 20:80 (dry basis) blend of the compound and the polymer. The resulting polymeric composition has a dielectric constant of 10.

Example 9

A polymeric composition is prepared as follows: 2.5 grams of Compound #3 are mixed with a solution of 10 grams of amorphous poly(ethylene terephthalate) in 40 grams of dichlorotetrafluoroacetone hydrate. The polymer has a dielectric constant of 3.2, a $T_g$ of 70° C., and an intrinsic viscosity of 0.6 as measured from a dilute solution in a 60:40 blend of phenol and tetrachloroethane. A film is cast from the solution of polymer and Compound #3 on a preheated glass plate, the solvent is evaporated from the film at 100° C., the film is cooled to room temperature and removed from the plate. The resulting product is useful as an electrical insulation material and as a binder in electroluminescent panels.

Example 10.—Diethylsulfonium dicyanomethylide (Compound #4)

Compound #4 is prepared by Method M-2 as follows: A solution of 230 grams of 2,2-dicyano-3,3-bis(trifluoromethyl) oxirane in 714 grams of diethyl ether is prepared, and to this solution 180 grams of ethyl sulfide are added with stirring. Stirring is continued for 30 minutes. The reaction that occurs during this period yields Compound #4 as a white precipitate, which is filtered, washed with ether, recrystallized from ethanol and dried. There are obtained 110 grams (74% yield) of Compound #4 as colorless needles having a melting point of 85–86° C. Analysis of the compound for $C_7H_{10}N_2S$ gives the following results:

Calculated: percent C, 54.52; H, 6.54; N, 18.17; S, 20.79. Found: percent C, 54.79; H, 6.28, N, 18.16; S, 20.95.

Example 11.—Phenylmethylsulfonium dicyanomethylide (Compound #5)

Compound #5 is prepared by Method M-1 as follows: A solution of 12.4 grams (0.10 mole) of thioanisole and 14.4 grams (0.10 mole) of TCNEO in 25 ml. of tetrahydrofuran and 40 ml. of ether is prepared and allowed to stand at 22° C. for 24 hours. Then the volatile components are removed by evaporation, leaving a dark reddish liquid containing Compound #5 in impure form. This liquid is dispersed in 40 ml. of ethylene chloride and the resulting dispersion is allowed to wash over 150 grams of alumina in a chromatographic column. The resulting impregnated alumina is washed with 100 ml. of ethylene chloride to remove unreacted thioanisole. The alumina is then washed with 600 ml. of ethylene chloride followed by 500 ml. of acetonitrile. Evaporation of the solvents collected from the latter two treatments leaves 12.9 grams (68% yield) of slightly impure Compound #5, which is recrystallized from methyl ethyl ketone as colorless cubes having a melting point of 77–78° C. Analysis of the compound according to $C_{10}H_8N_2S$ gives the following:

Calculated: percent C, 63.90; H, 4.25; N, 14.88. Found: percent C, 64.02; H, 4.42; N, 14.64.

Example 12

A polymeric composition for use in electroluminescent lighting panels is prepared as described in Example 2 except Compound #5 is used in place of Compound #1 and the compound is added to the polymer solution in an amount sufficient to give a 20:80 (dry basis) blend of the compound and the polymer. The resulting polymeric composition has a dielectric constant of 23.2 and a dissipation factor of 6.9%.

Example 13.—Phenylethylsulfonium dicyanomethylide (Compound #6)

Compound #6 is prepared at 75% yield from a solution of phenyl ethyl sulfide and TCNEO in a manner similar to that described in Example 11. The crystalline compound has a melting point of 75–76° C. Analysis of the compound according to $C_{11}H_{10}N_2S$ gives the following:

Calculated: percent C, 65.30; H, 5.00; N, 13.88. Found: percent C, 65.10; H, 5.14; N, 14.13.

Example 14.—Phenylbutylsulfonium dicyanomethylide (Compound #7)

Compound #7 is prepared at 74% yield from a solution of phenyl-n-butyl sulfide and TCNEO in a manner similar to that described in Example 11. The compound is a liquid at 22° C. Analysis of the compound for C and H according to $C_{13}H_{14}N_2S$ gives the following:

Calculated: percent C, 67.8; H, 6.08. Found: percent C, 67.3; H, 6.26.

Example 15.—2-naphthylmethylsulfonium dicyanomethylide (Compound #8)

Compound #8 is prepared at 74% yield from a solution of 2-naphthylmethyl sulfide and TCNEO in a manner similar to that described in Example 11. The crystalline compound has a melting point of 136–137° C. Analysis of the compound according to $C_{14}H_{10}N_2S$ gives the following:

Calculated: percent C, 70.62; H, 4.21; N, 11.75. Found: percent C, 70.78; H, 4.44; N, 11.67.

Example 16.—P-bromophenylmethylsulfonium dicyanomethylide (Compound #9)

Compound #9 is prepared at 45% yield from a solution of p-bromothioanisole and TCNEO in a manner similar to that described in Example 11. The crystalline compound has a melting point of 121–123° C. Analysis for bromine content on the basis of $C_{10}H_7BrN_2S$ gives:

(a) Calculated=30.08% Br; (b) Found=30.14% Br.

The p-bromothioanisole reactant is prepared by slowly adding 14 parts of dimethyl sulfate to a solution of 37.8 parts of p-bromothiophenol in 200 parts of water containing 12 parts of sodium hydroxide, refluxing the mixture for 1.5 hours, cooling, extracting with 3 separate 150 part portions of either, washing the combined extracts with 100 parts of saturated sodium chloride solution, drying the extracts with magnesium sulfate, and evaporating the ether. The colorless solid obtained is recrystallized from petroleum ether to give 36.8 parts of the thioanisole (90% yield), which has a melting point of about 40° C.

Example 17.—P-methoxyphenylmethylsulfonium dicyanomethylide (Compound #10)

Compound #10 is prepared at 67% yield from a solution of p-methoxythionisole and TCNEO in a manner similar to that described in Example 11. The recrystalline compound has a melting point of 92–93° C. Analysis of the compound according to $C_{11}H_{10}N_2OS$ gives the following:

Calculated: percent C, 60.60; H, 4.59; N, 12.84. Found: percent C, 60.76; H, 4.55; N, 13.02.

*Example 18.—P-thiomethoxyphenylmethylsulfonium dicyanomethylide (Compound #11)*

Compound #11 is prepared at 57% yield from a solution of dithiohydroquinone dimethyl ether and TCNEO in a manner similar to that described in Example 11. The crystalline compound has a melting point of 136–137° C. Analysis for sulfur content on the basis of $C_{11}H_{10}N_2S_2$ gives: (a) Calculated=27.32% S; (b) Found=27.40% S.

We claim:

1. A composition comprising a blend of a polymer and a compound having the formula

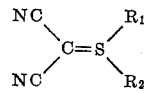

wherein $R_1$ and $R_2$ are selected from the group consisting of
  (A) separate groups selected individually from
    (1) $C_1$ to $C_{20}$ alkyl and $C_2$ to $C_{20}$ substituted alkyl in the case of $R_1$, and
    (2) aryl, substituted aryl and the groups listed for $R_1$ in the case of $R_2$, and
  (B) a single $C_3$ to $C_6$ group which together with the sulfur atom to which the single group is attached forms a non-aromatic cyclic group.

2. A composition comprising a solid thermoplastic polymer and a compound dissolved in the polymer said compound being as described in claim 1.

3. A composition as defined in claim 2 wherein said polymer is selected from the group consisting of polymers of alkyl acrylate, alkyl methacrylate and blends thereof.

4. A composition as defined in claim 2 wherein the weight ratio of the compound to the polymer is about 1:99 to 80:20.

5. A composition as defined in claim 2 wherein the compound is dibutylsulfonium dicyanomethylide.

References Cited

UNITED STATES PATENTS 3,282,961   11/1966   Graham et al. _____ 260—329

LEON D. ROSDOL, *Primary Examiner.*

J. D. WELSH, *Assistant Examiner.*